(12) United States Patent
Pannell (10) Patent No.: US 8,296,421 B1
(45) Date of Patent: Oct. 23, 2012

(54) METHODS, ALGORITHMS, CIRCUITS, AND SYSTEMS FOR CONTROLLING A NETWORK CONNECTION STATUS INDICATOR

(75) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 202 days.

(21) Appl. No.: 12/581,068

(22) Filed: Oct. 16, 2009

Related U.S. Application Data (60) Provisional application No. 61/107,843, filed on Oct. 23, 2008.

(51) Int. Cl.
*G06F 15/173* (2006.01)

(52) U.S. Cl. ........ 709/224; 709/202; 709/230; 709/232; 709/236; 709/248; 709/200

(58) Field of Classification Search .................. 709/202, 709/224, 230, 232, 236, 248, 200
See application file for complete search history.

(56) References Cited

U.S. PATENT DOCUMENTS

| | | | |
|---|---|---|---|
| 5,553,240 | A | 9/1996 | Madduri |
| 5,732,224 | A | 3/1998 | Gulick et al. |
| 7,092,362 | B1 * | 8/2006 | Demakakos et al. ......... 370/249 |
| 7,730,230 | B1 * | 6/2010 | Kondapalli ..................... 710/15 |
| 8,135,853 | B1 | 3/2012 | Khan |
| 2008/0134300 | A1 * | 6/2008 | Izatt ................................ 726/4 |
| 2008/0298447 | A1 * | 12/2008 | Yoo et al. ...................... 375/225 |
| 2009/0010178 | A1 * | 1/2009 | Tekippe ......................... 370/254 |
| 2009/0202250 | A1 * | 8/2009 | Dizechi et al. ................ 398/107 |
| 2009/0284934 | A1 * | 11/2009 | Nielsen et al. ................ 361/730 |
| 2009/0310726 | A1 * | 12/2009 | Alankry et al. ............... 375/359 |

OTHER PUBLICATIONS

Interworking Task Group of IEEE 802.1; "Timing and Synchronization for Time-Sensitive Applications in Bridged Local Area Networks"; Draft Standards for Local and Metropolitan Area Networks—P802.1AS/D0.8; May 25, 2007; 149 pages; The Institute of Electrical and Electronics Engineers, Inc., New York, NY.
Precise Network Clock Synchronization Working Group of the IM/ST Committee; "Draft Standard for a Precision Clock Synchronization Protocol for Networked Measurement and Control Systems"; IEEE P1588 D2.2; 2007; 299 pages; The Institute of Electrical and Electronics Engineers, Inc., New York, NY.
"Non-Final Office Action", U.S. Appl. No. 12/270,482, (Nov. 12, 2010), 8 pages.
"Non-Final Office Action", U.S. Appl. No. 12/270,482, (Apr. 28, 2011), 6 pages.
"Non-Final Office Action", U.S. Appl. No. 12/270,482, (May 26, 2010), 7 pages.
"Notice of Allowance", U.S. Appl. No. 12/270,482, (Oct. 25, 2011), 7 pages.

* cited by examiner

*Primary Examiner* — Liangche A Wang (57) ABSTRACT

Apparatuses, methods, systems, and circuits for controlling a network connection status indicator (such as a light-emitting diode) are disclosed. In one embodiment, a method of controlling a status indicator includes receiving a data unit of fixed or predetermined length in a device coupled to the network, detecting whether the received data unit is a protocol control unit (e.g., a timing protocol frame), restricting activity of the status indicator in response to the received data unit being detected as the protocol control unit, and allowing the activity of the status indicator in response to the received data unit being detected as a unit type other than the protocol control unit.

16 Claims, 7 Drawing Sheets

METHODS, ALGORITHMS, CIRCUITS, AND SYSTEMS FOR CONTROLLING A NETWORK CONNECTION STATUS INDICATOR

RELATED APPLICATIONS

This application claims the benefit of U.S. Provisional Patent Application No. 61/107,843, filed Oct. 23, 2008, incorporated herein by reference in its entirety.

FIELD OF THE INVENTION

The present disclosure generally relates to the field of electronic control systems. More specifically, embodiments of the present disclosure pertain to circuits and methods for controlling a status indicator of a link or connection in a network light-emitting diode (e.g., an LED).

DISCUSSION OF THE BACKGROUND

Light-emitting diodes (LEDs) are used to indicate various status information by blinking or maintaining an on or off state. For example, LEDs are used to indicate data flow and/or link status for a communication link between devices in a network. A single LED can indicate that no communication link is established by remaining off, a link has been successfully established but no data is flowing by remaining on, and a link is established and data is flowing by blinking.

In some networks, packets or frames (e.g., Ethernet frames) include timing control information to allow for timing across various network components to be synchronized by having a time concept communicated across the network. For example, networks used for coordinated factory operations, or those synchronizing sound with video (e.g., audio/video bridging (AVB)) or with other audio channels, use such timing controls so that each device knows when to play the sound or when to move an actuator. However, drawbacks of LED link status indicators where such timing protocols are used include a loss of distinction between indications of normal data flow and those related to a timing protocol.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to algorithms, circuits, systems, and methods for controlling a status indicator of a link or connection in a network, such as a light-emitting diode (LED). In one aspect, the disclosure concerns a controller configured to control a status indicator of a link or connection in a network. The controller generally includes a receiver configured to receive a data unit from the network, logic configured to detect whether the received data unit is a protocol control unit, logic configured to restrict activity of the status indicator in response to the received data unit being detected as the protocol control unit, and logic configured to allow the activity of the status indicator in response to the received data unit being detected as a unit type other than the protocol control unit. The systems generally include one or more aspects of the controller.

In another aspect, the disclosure concerns a method of controlling a status indicator of a link or connection in a network. The method generally includes receiving a data unit of fixed or predetermined length in a device coupled to the network, detecting whether the received data unit is a protocol control unit, restricting activity of the status indicator in response to the received data unit being detected as the protocol control unit, and allowing the activity of the status indicator in response to the received data unit being detected as a unit type other than the protocol control unit. The algorithms are generally adapted to perform at least some aspects of the method.

The present disclosure advantageously provides a controller and method for controlling a status indicator of a link or connection in a network (e.g., an LED) for frames or other data units (such as packets) involving timing protocols or Layer 2 (IEEE 802.1) protocols. The present control approach can partially or fully mask LED blinking or other status indicator activity for timing protocol frames, while allowing LED blinking and/or other status indicator activity for data frames, thereby increasing a communications capability of a status indicator on a network port. The concepts disclosed herein can be applied to masking network connection status indicator activity (e.g., LED blinking) for any periodic protocol that prevents the status indicator from indicating the flow of data frames. These and other potential advantages will become readily apparent from the detailed description of various embodiments below.

DETAILED DESCRIPTION

Reference will now be made in detail to embodiments of the invention, examples of which are illustrated in the accompanying drawings. While the invention will be described in conjunction with various embodiments, it will be understood that the described embodiments are not intended to limit the invention. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present disclosure. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "signal(s)" and "waveform(s)" may be used interchangeably, however, these terms are also given their art recognized meanings. Also, for convenience and simplicity, the terms "clock," "time," "rate," "period" and "frequency" may be used interchangeably, as well as the terms "data," "data stream," and "information" and in general, use of one such form generally includes the others, unless the context of the use unambiguously indicates otherwise. The terms "node(s)," "input(s)," "output(s)," and "port(s)" may be used interchangeably, as well as the terms "connected to," "coupled with," "coupled to," and "in communication with" (which terms also refer to direct and/or indirect relationships between the connected, coupled and/or communicating elements, unless the context of the term's use unambiguously indicates otherwise). However, these terms are also generally given their art-recognized meanings.

The invention, in its various aspects, will be explained in greater detail below with regard to exemplary embodiments.

To accommodate networks aiming to maintain network timing synchronization across various network devices, a time concept may be communicated across the network via data units (e.g., frames, packets, etc.). The data units can have a fixed or variable length, depending on the data transmission protocol employed. One such way to communicate a time concept is by using precise timing protocol (PTP), which is IEEE standard 802.1AS (a profile under IEEE 1588 version 2). In general, any suitable protocol or approach for conveying timing information can be employed in particular embodiments. For example, the present circuitry and method(s) can be applied to any Layer 2 and/or IEEE 802.1 protocol (e.g., the "spanning tree" protocol, etc.) In any event, such a timing protocol can include conveying a 'time' concept by using standard frames (e.g., Ethernet frames), packets, etc., such that various stations or devices within or on the network are made aware of the network time.

Figure 1:
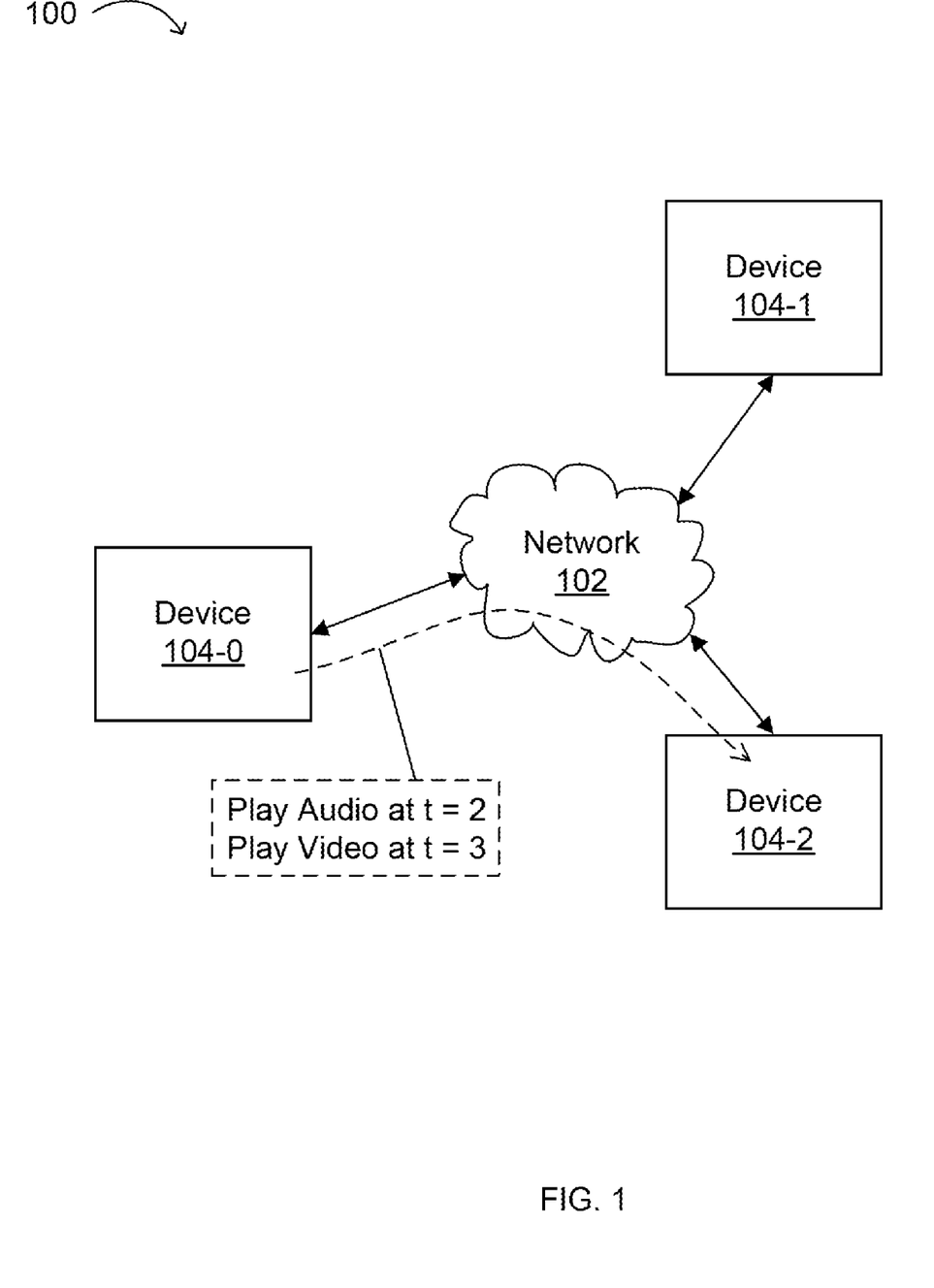
FIG. 1 is a block diagram showing an exemplary timing protocol application in a network environment.

FIG. 1 illustrates is a block diagram 100 of an exemplary timing protocol application in a network environment. For example, network 102 and devices (e.g., 104-0, 104-1, and 104-2) may be used for coordinated factory operations, or those synchronizing sound with video (e.g., audio/video bridging (AVB)) or with other audio channels, to use such timing controls to know when to play the sound or when to move an appropriate actuator. In operation, timing protocols (e.g., PTPs) can periodically send timing protocol frames from one device (e.g., 104-0) to another device (e.g., 104-2) in the network.

These timing protocol frames can be used to communicate a network time to each participating device 104 on the network in order to capture local arrival and departure times of the protocol frames. In each device 104, the local arrival time of a timing protocol frame (e.g., as determined using time stamping logic) can be compared to a time at which the protocol (e.g., PTP) indicates the timing protocol frame should have arrived at the device. This time difference can then be used to adjust local clocks on the receiving device (e.g., 104-2) to be synchronized with those of transmitting device 104-0. In addition, the more often the timing protocol runs or sends such timing protocol frames between devices or components, the more accurate the corresponding time synchronization. For example, a protocol exchange between devices 104 can range from about 1/sec to about 100/sec, where such protocol exchanges can each include multiple timing protocol frames. While the protocol exchanges might occur fairly often and regularly, these timing protocol frames can be relatively small as compared to data or other control frames, such that the presence of such timing control frames passing through network 102 likely does not have an appreciable effect on network bandwidth.

Figure 2:
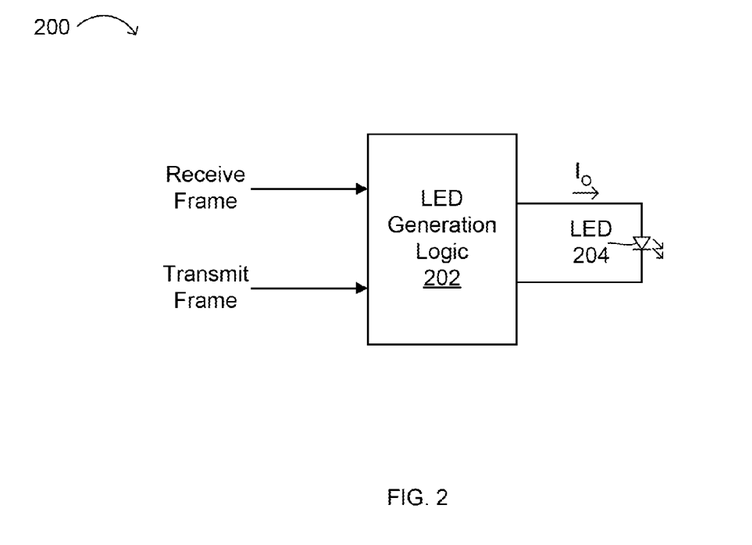
FIG. 2 is a block schematic diagram showing an exemplary light-emitting diode (LED) controller system.

FIG. 2 shows a block schematic diagram 200 of an exemplary light-emitting diode (LED) controller system. Many physical layer devices (e.g., Ethernet PHY devices) and switches support generation of one or more LED controls (e.g., current $I_O$ control via LED generation logic 202) on each physical port on the device. For example, one LED communication function is to indicate that a link or a successful connection of a cable from one device/box to another device/box has been established such that data can flow over that network cable. Another LED communication function is to indicate an activity, such as transmission or reception of data over the cable. For example, these functions can be combined into a single LED 204 operation, as shown below in Table 1.

TABLE 1

| LED State: | Communication Function: |
| --- | --- |
| Off | No link established |
| On | Link established, but no data flowing |
| Blinking at X rate | Link established and data flowing |

The blinking of an LED to indicate link activity can allow network administrators or end users to determine that a job or application is actually flowing through the network. Also, constant or ongoing LED blinking can be an indication of a severe network problem, such as a bridge loop that can result in inaccurate frame forwarding. In another LED activity indication, LED blinking that stops for short times while otherwise blinking most of the time can be an indication of an overloaded network. Further, periodic bursts of LED blinking with relatively long intervals of no blinking can indicate a healthy network that is working fine and is not overloaded.

In this fashion, various network states can be communicated using a relatively small number of LEDs. However, timing protocols (e.g., PTPs) can alter the network activity communications capabilities of LEDs, because such protocols can be run sufficiently frequently (e.g., from about 1/sec to about 100/sec, or more, per port) to result in a corresponding LED continuously blinking whenever these protocols are running. Because such constant, regular blinking can be interpreted as an indication of a severe network problem, some confusion can result upon introduction of such timing protocols into a network. Also, different protocols can result in different effects on LED activity. For example, a "spanning tree" managed network protocol might only utilize one timing frame per second per port. As a result, an associated indicator LED can blink relatively slowly as a result. However, because PTPs can utilize 10-100 frames per second per port, the LED activity can resemble normal data traffic as a result.

An Exemplary LED Controller

Figure 3:
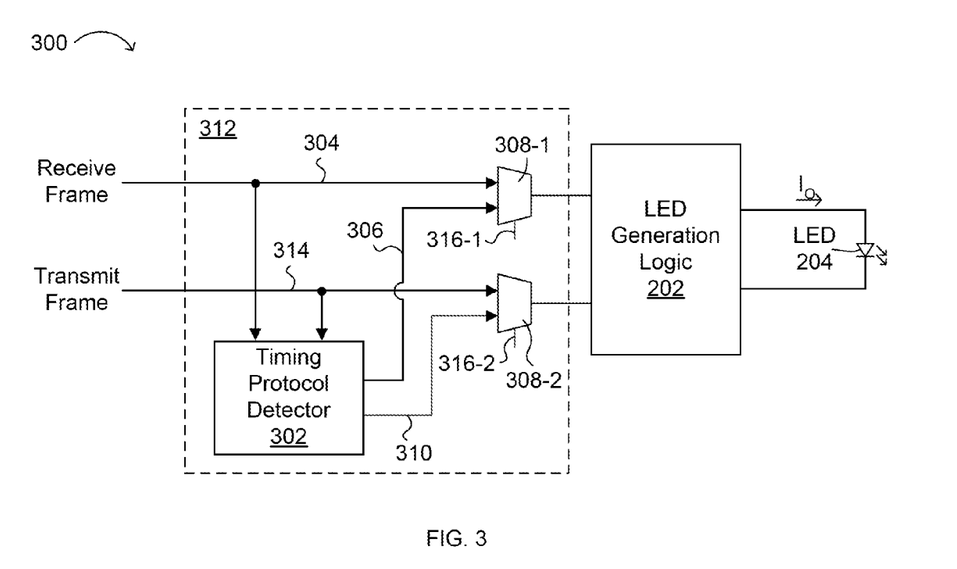
FIG. 3 is a block schematic diagram showing an exemplary LED controller configured for network timing protocols.

FIG. 3 shows a block schematic diagram 300 of an exemplary LED controller configured for network timing protocols. This particular example illustrates a network timing protocol filtering or restriction mode approach whereby all timing protocol related frames are restricted from participating in LED operation. Thus, LED filtering logic 312 can act to mask all timing protocol related frames from LED activity generation. Particular embodiments also support a partial restriction mode approach whereby timing protocol related frames are allowed to participate in LED operation, but at a different (e.g., reduced) rate to allow for appropriate functional communications. This partial restriction mode or enhanced filtering operation can be selected by a user, and will be discussed in more detail below. Further, while examples herein are related to timing protocols, particular embodiments can also be used in any system that checks or monitors link or connection activity that can be related to or indicated by the activity of an LED or other status indicator.

Figure 4:
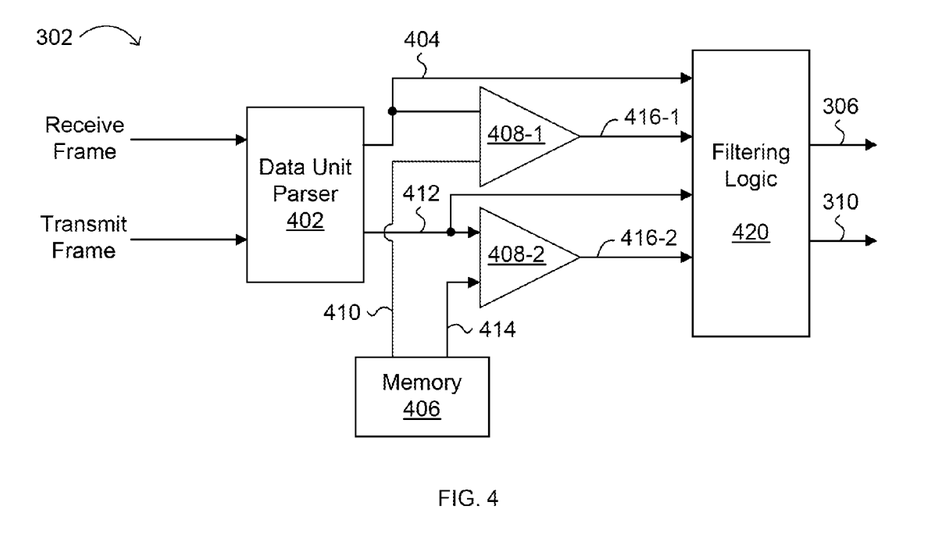
FIG. 4 is a block schematic diagram showing an exemplary timing protocol detector.

In FIG. 3, a timing protocol (e.g., PTP) detector 302 detects any frames or other data units of the timing protocol received or transmitted over the network. As shown in the example of FIG. 4, timing protocol detector 302 can include a data unit parser 402, a memory unit 406, comparators 408-1 and 408-2, and filtering logic 420, although any suitable components and/or arrangements (such as, e.g., components in conventional time-stamping logic) can be used in particular embodiments. For example, data unit parser 402 can parse various fields (e.g., receive field 404 and transmit field 412; see also FIGS. 6-7 and the discussions thereof) from the received or transmitted frame or data unit. The parsed or selected field(s) 404, 412 (e.g., at predetermined positions in the received or transmitted data unit) can be compared (e.g., using bit-for-bit comparators 408-1 and 408-2) against a predetermined value 410 or 414 stored in the memory unit 406. A comparison match can indicate that the received data unit is a PTP frame, such as by bringing signal 416-1 or 416-2 high. Examples of such fields and frame structures are shown below in FIGS. 6 and 7.

The filtering logic 420 receives timing protocol match signals 416-1 and 416-2 along with the parsed or selected receive field 404 and transmit field 412. When a comparator 408-1 or 408-2 determines that the current frame is a timing protocol frame to be filtered, then filtering logic 420 removes the current frame from the 'connection activity' or frame presence signal 306 or 310 to the LED Generation Logic 202. In one embodiment, filtering logic 420 includes one or more delay elements configured to delay the parsed or selected receive field 404 and transmit field 412, for example by a length of time at least about as long as the sum of the time necessary for the data unit parser 402 to receive a field indicating that the current frame is a timing protocol frame and the time delay of the comparator 408-1 or 408-2. Alternatively, the filtering logic 420 can be configured to indicate connection activity at the end of a frame or other data unit, rather than at the beginning of the frame or other data unit. When the comparator 408-1 or 408-2 determines that the current frame is not a frame to be filtered (e.g., the current frame is not a timing protocol frame), then filtering logic 420 outputs an active 'connection activity' or frame presence signal 306 or 310. Logic configured to implement such a filtering function can be designed and used.

Returning to the example of FIG. 3, to indicate the connection status and network activity over the connection to LED generation logic 202, multiplexer 308-1 selects the 'connection activity' or frame presence signal 306 or a receive frame 304, and multiplexer 308-2 selects the 'connection activity' or frame presence signal 310 or a transmit frame 314, as an input to the LED generation logic 202. Thus, the timing protocol detector 302 activity can be selected independently for receive data units and transmit data units. In one approach, multiplexers 308-1 and 308-2 are configured to select (e.g., using one or more memory or configuration bits 316-1, 316-2) outputs 306 and 310 from the timing protocol detector 302, respectively representing receive frames and transmit frames with the timing protocol frames filtered out as described with regard to FIG. 4. All other frames can cause the LED 204 to blink (via LED generation logic 202). This approach may be particularly suitable for applications where LED activity generation logic 202 and network time stamping logic (not shown) are contained in the same device. However, this approach can also be used for other device configurations and arrangements. In this fashion, network activity indicator LEDs can function substantially similarly to network activity indicator LEDs in non-timing protocol networks by operating as shown above in Table 1 for data traffic (non-timing protocol traffic), regardless of any occurrences of any timing protocol frames.

The LED activity generation logic 202 can be implemented in a network port's physical layer (PHY) device. Alternatively, the LED activity generation logic 202 can be implemented via the port's switch media access control (MAC) logic. In any event, LED 204 can be made to blink when receive or transmit activity is detected at the port by the PHY, MAC, or any other suitable logic or other circuitry. Further, timing protocol time stamping logic used to register arrival and/or departure time of the timing protocol frames for time stamping can also be placed into the PHY, MAC, or other device/location (e.g., in a register and/or latch at an input to a comparator). For example, a PHY configured for gigabit operations can be able to capture a time stamp of every frame at an accuracy rate of about 125 MHz per wire or link. In addition to the timing protocol time stamping logic detecting which frames to time stamp, this logic can also be used detect all timing protocol frames. As will be discussed below with reference to FIG. 6, timing protocol frame detection (e.g., in IEEE 802.1AS) can be performed by examining the frame's Ether type and corresponding sub type. And as will be discussed below with reference to FIG. 7, other fields (e.g., defined in IEEE 1588) of the frame can be examined to determine whether a frame is a timing protocol frame.

Figure 5:
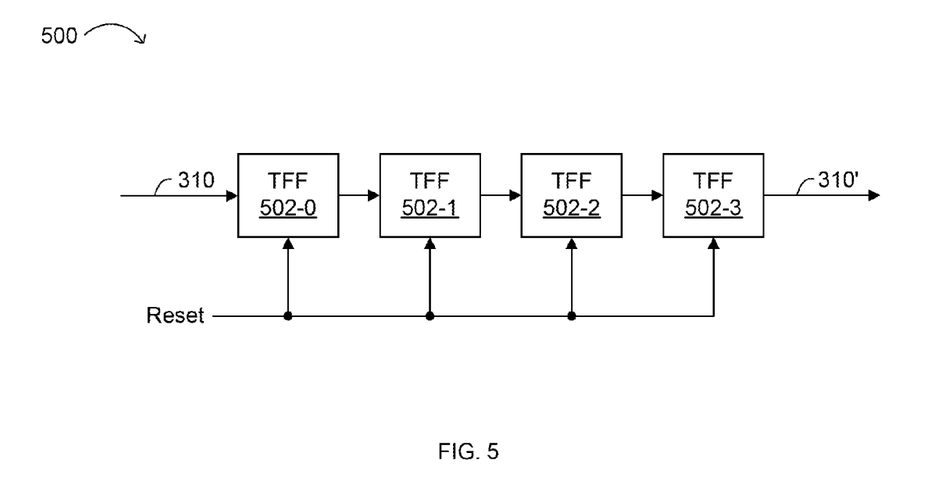
FIG. 5 is a block schematic diagram showing an example counter circuit for a partial restriction mode.

In a partial restriction mode or enhanced timing protocol filtering mode, and referring back to FIG. 3, LED filtering logic 312 can be modified such that a corresponding network activity indicator LED (e.g., LED 204) can also indicate whether a timing protocol (e.g., PTP) is running on a port or not. For example, this can be done by counting a number of timing protocol frames that are being filtered to associated LED activity logic, and then allowing through (not filtering) 1 out of every N occurrences. An embodiment of a counter 500 is shown in FIG. 5, where "trigger" flip-flops (TFFs 502-0, 502-1, 502-2, and 502-3) are used in an asynchronous ripple counter configuration. A reset input can be used to reset counter 500, e.g., upon power-up, or based on other reset controls (such as output 310' changing to an active state).

Other types of counters (e.g., synchronous), as well as other types of counting components (e.g., other types of flip-flops, etc.) can also be used in particular embodiments. Also, while only four counter stages are shown in this particular example, any number of stages can be employed. The number of stages can be based on the value of N, for example. In one embodiment, the predetermined value of N can be programmed by a user into a register. Further, each stage 502 can be separately enabled (not shown) based on the programmed N value. In any event, a modified signal 310' can replace signal 310 of FIG. 3, or otherwise be combined (e.g., via logic gates) with signal 310 (e.g., to generate a pulse), as part of LED filtering logic 312.

In some applications, such a 1 out of N non-filtering function can be performed in the transmit direction, and not necessarily in the receive direction. User-programming can also be used to enable or disable this directional filtering function, such as by enabling the timing protocol frame filtering in only the transmit direction, only the receive direction, or in both receive and transmit directions. Some applications can enable the filtering in only the transmit direction because a local central processing unit (CPU) can control a rate at which timing protocol frames are sent out a port, while the receive rate for PTP frames may not be as controllable. Control over the transmit rate allows the non-filtering function to occur at regular intervals such that a combined link and transmission activity LED can have the functions as shown below in Table 2.

TABLE 2

| LED State: | Communication Function: |
| --- | --- |
| Off | No link established |
| On | Link established, but no data flowing, and no timing protocol running |
| Blinking at Y rate | Link established with timing protocol running, but no other data flowing |
| Blinking at X rate | Link established and data flowing |

In this fashion, the LED 204 can blink at a rate of Y Hz, where Y is a value that is effectively user-programmable (e.g., by programming a count value of N via a register). For example, Y can be from about 0.2 to about 2 Hz. This technique is applicable to timing protocol frame detection when no other data is flowing. This regular blinking essentially provides a relatively slow and steady 'heart beat' to indicate that timing protocol (e.g., PTP) frames are flowing for proper timing protocol operation. The LED blinks relatively fast (e.g., at a rate of X Hz, where X is greater than Y) to indicate the presence of non-timing protocol frames (e.g., data traffic) flowing. For example, X can be from about 2 Hz to about 10 Hz. The blink rates and patterns can match the non-timing protocol data traffic flow rates as for the non-timing protocol case (e.g., as shown above in Table 1, where X is the same blinking rate as in Table 1).

In certain embodiments, a timing protocol control block, for example including LED filtering logic 312, can filter most timing protocol frames receive and transmit activity to, e.g., the receive and transmit activity inputs of a PHY or MAC device. Each timing protocol frame can be filtered or otherwise restricted, and not only the timing protocol frames that are time-stamped. The PHY may already include logic to control activity of the LED (e.g., stretching, blinking, etc.) and that can combine signals indicating receive and transmit activity at the PHY to the indicator LED (or transmit indicator LED, or receive indicator LED, etc.). As such, the logic and the PHY can be modified to allow this receive and transmit to be provided, alternatively or additionally, from a timing protocol (e.g., PTP) block, such as for time stamping logic, etc., elsewhere in the system.

A timing protocol block (e.g., 302) can be configured to determine which frames are timing protocol (e.g., PTP) or timing protocol-related frames, and which frames are of other types (e.g., data traffic). Those frames that are not timing protocol-related can be allowed to energize, enable, or otherwise activate transmit and/or receive activity indications for an indicator LED by passing control signals into the PHY, as would be done for a non-timing protocol system (e.g., as shown above in Table 1). Thus, a "normal" LED activity control can occur for non-timing protocol-related frames. This can be the case even if the frames have cyclic redundancy check (CRC) errors, or the frames are runts (incomplete frames/packets), etc., such that all non-timing protocol frames can be indicated just as for non-timing protocol networks in the LEDs associated with the PHY. Also, while the additional logic (e.g., LED filtering logic 312) that detects timing protocol frames, etc., may result in a slight time delay (e.g., via paths in timing protocol detector 302, as well as any counters (e.g., 500) and associated logic (e.g., gates 304, 308, etc.)) in activating an LED, this time delay is likely not noticeable to a user because the LEDs are stretched substantially longer than this delay in any event, in order for the user to ascertain an LED blinking function.

In some situations, such as the in full restriction mode, the LEDs can be fully inactive even when the timing protocol is running. This could make it appear to a user that the timing protocol is not up and running when the protocol is in fact operational. An enhanced or partially restricted mode can be enabled to accommodate this case whereby one out of every N (1/N) timing protocol frames can be allowed through to transmit or receive activity lines to the PHY to turn on the LEDs. User-programmable registers can be used to enable partial or full restriction mode, as well as to set the value of N for partial restriction mode. For example, a default value of 0x80 (128 as converted from hexadecimal format) can be set as N, and N can be user-programmable to be changed to any positive integer value. For the default case where N=128, 1 out of every 128 timing protocol transmit frames can cause the corresponding port's indicator LED to blink, or otherwise contribute to the blinking control. However, N can be any integer of from 2 (e.g., 3, 4, 8, etc.) to 32, 64, 256, $10^3$, $10^4$, or more, depending on the frame transmission rate, the frame size, the blinking rate X of the LED when the link is established and data is flowing, etc. Also, the 1/N approach (as well as the LED blinking at a rate of Y Hz) can also be applied to timing protocols in packet-based networks or data transfer systems in which data is transmitted in block or units of defined or fixed length.

As discussed above, receive timing protocol frames can be completely filtered out because there is generally less control over how many timing protocol frames arrive at a port and/or the rate at which timing protocol frames arrive at a given port. Because the transmit rate is controlled and generated by the local CPU, these frames can be counted instead, giving a regular 'heart beat' that PTP is running Thus, in some embodiments, timing protocol frames received at a given port can also be counted and the LED turned on and off when a predetermined count value (e.g., 128) is reached, when this feature is enabled (e.g., by a user). Further, under typical "healthy" network conditions, the 128 value for either the received timing protocol frame count or for N above can cause the LED to blink once about every 4 to 5 seconds when no other data is on the link, subject to network operating frequency.

Figure 6:
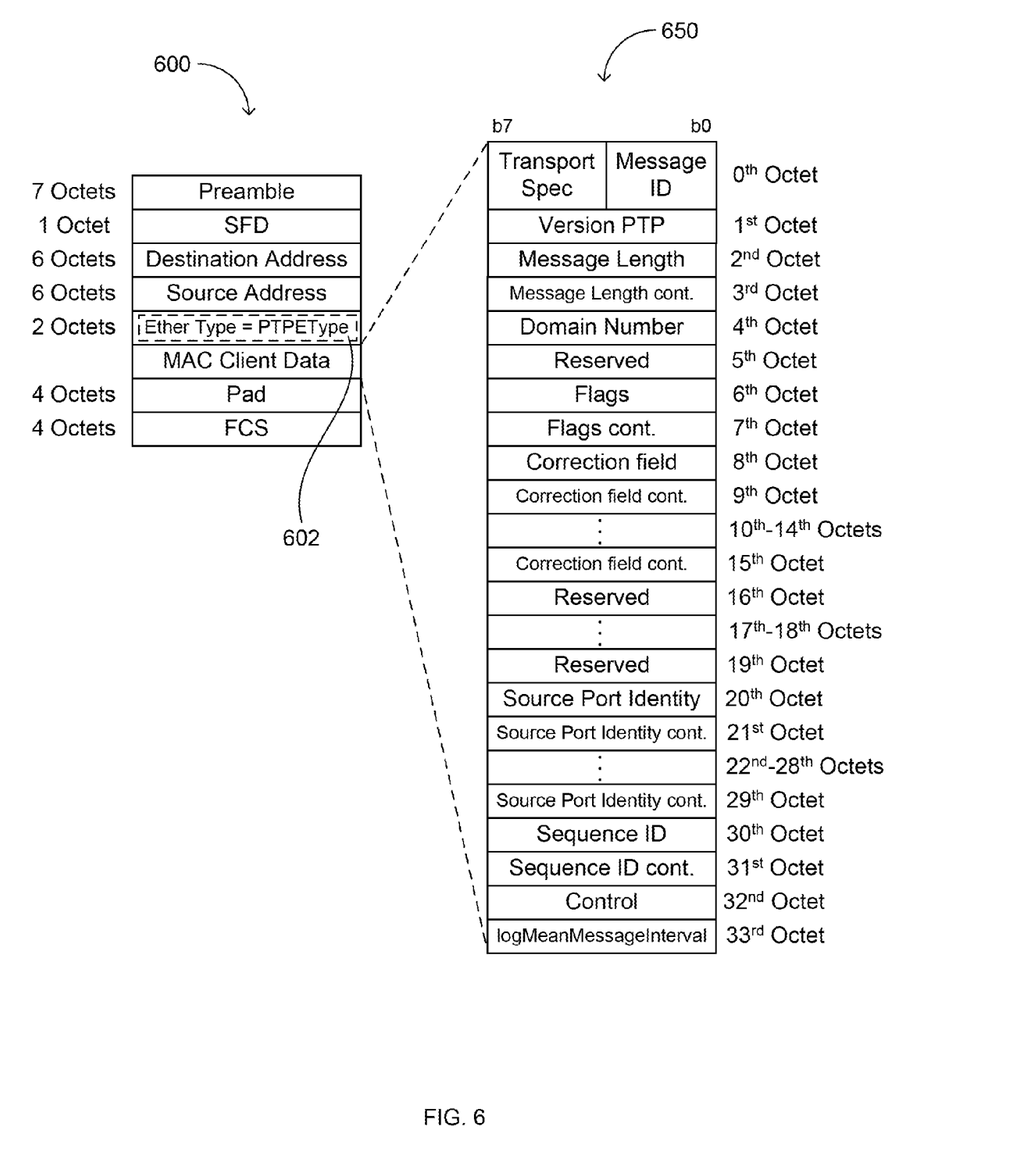
FIG. 6 is a diagram showing an exemplary layer 2 frame format for timing protocol detection.
Figure 7:
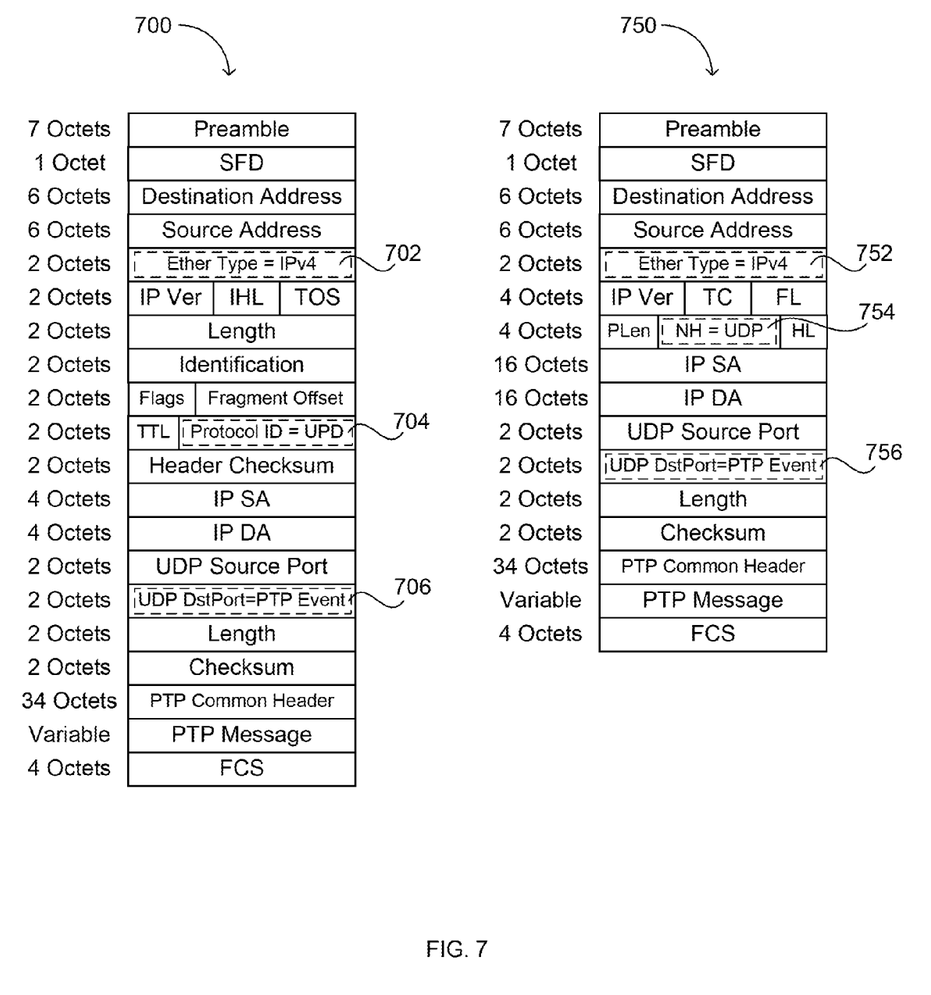
FIG. 7 is a diagram showing an exemplary layer 4 frame format for timing protocol detection.

FIGS. 6 and 7 show exemplary definitions of timing protocol (e.g., PTP) frames for purposes of LED activity filtering. FIG. 6 shows an exemplary layer 2 frame format for timing protocol detection, and FIG. 7 shows an exemplary layer 4 frame format for timing protocol detection. In FIG. 6, a PTP over Ethernet frame format 600 is shown, with a PTP common header 650. The PTP timing protocol can be determined by inspecting field 602 (e.g., Ether Type=PTPEType=0x88F7). For example, field 602, or a predetermined portion thereof, can be provided at signal 404 by data unit parser 402, as shown in FIG. 4.

In FIG. 7, a PTP over IPv4 and user datagram protocol (UDP) frame 700 and a PTP over IPv6 and UDP frame 750 are shown. The PTP timing protocol can be determined for frame 700 by inspecting field 702 (e.g., Ether Type=IPv4=0x0800), field 704 (e.g., Protocol ID=UDP=0x11), and field 706 (e.g., UDP destination port=0x013F (PTP event)=0x0140 (PTP general)). For example, fields 702 and/or 706, or predetermined portions thereof, can be provided at signal 404 by data unit parser 402, as shown in FIG. 4. The PTP timing protocol can be determined for frame 750 by inspecting field 752 (e.g., Ether Type=IPv6=0x86DD), field 754 (e.g., Next header=UDP=0x11), and field 756 (e.g., UDP destination port=0x013F (PTP event)=0x0140 (PTP general)). For example, fields 752, 754, and/or 756, or predetermined portions thereof, can be provided at signal 404 by data unit parser 402, as shown in FIG. 4

Figure 8:
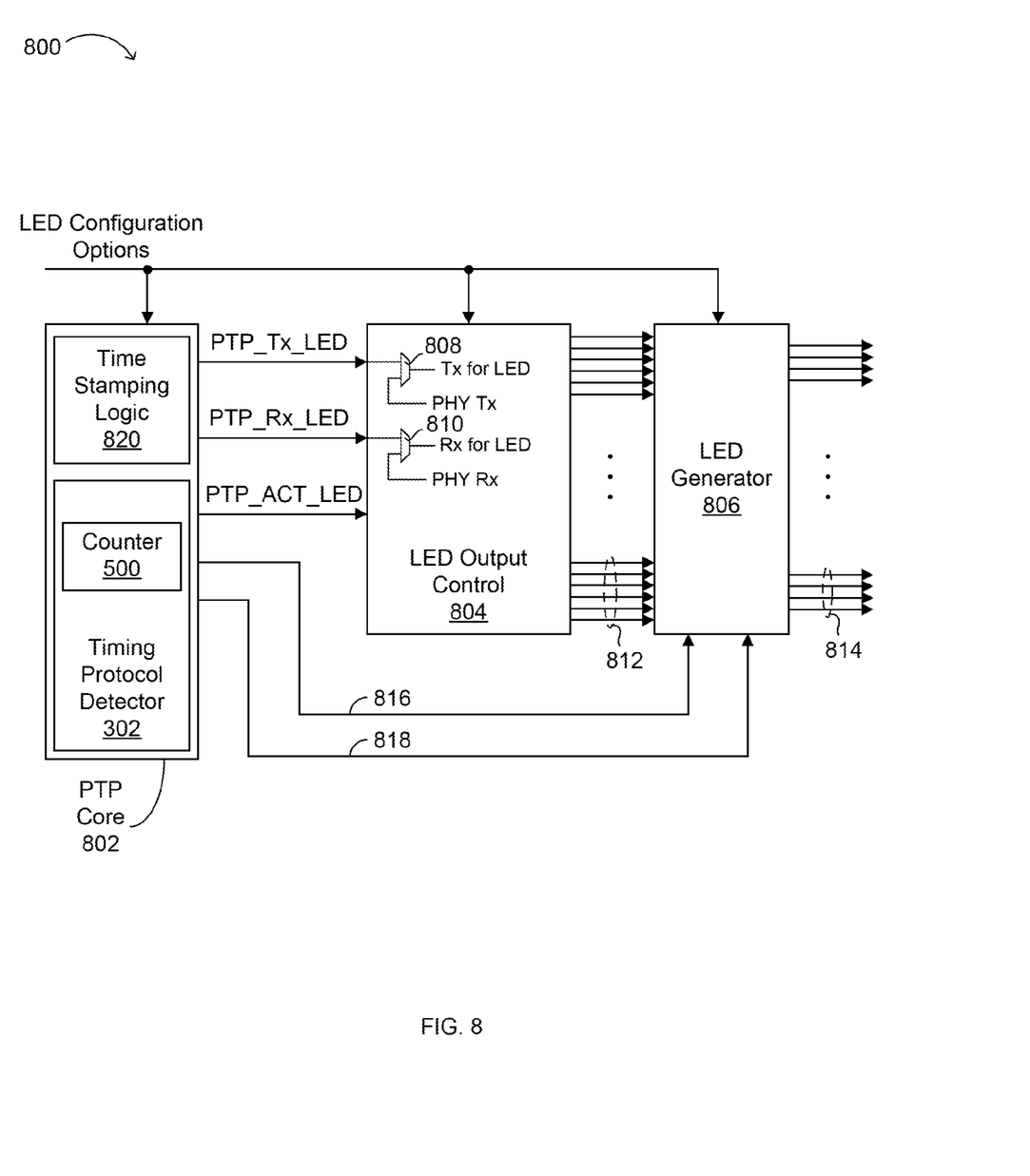
FIG. 8 is a block schematic diagram showing an exemplary LED controller arrangement.

FIG. 8 shows a block schematic diagram 800 of an exemplary LED controller. The PHY, MAC, or other circuit, can be modified from non-timing protocol related applications to obtain receive and transmit activity from PTP core block 802 instead of from LED output control 804 (for example, via multiplexers 808 and 810 in LED output control block 804). One or more register or configuration bits in the PHY can select between these two modes (e.g., one bit for transmit activity and one bit for receive activity, or one bit for both transmit and receive activity). For example, a multiplexer control register bit in a first state can indicate that all receive (e.g., PHY Rx) and/or transmit (e.g., PHY Tx) frames can contribute to generation of LED activity. However, if the multiplexer control register bit is in a second state, the receive and/or transmit frames are taken through timing protocol detection logic 302, etc., such that timing protocol related frames are partially or fully masked out from LED indicator activity, as discussed above. In addition, separate transmit and receive path LED activity, and LED activity as related to timing protocol frame filtering, can also be controlled via LED configuration options (e.g., as programmed into volatile memory [e.g., one or more registers] and/or non-volatile memory [e.g., EPROM or flash memory configuration bits], either on-chip or off-chip in one or more memory units associated with a CPU controlling part or all of the functionality of the PHY or MAC).

In addition, user-programmable LED configuration options/registers (e.g., for selection of full or partial restriction mode, value of N, etc.), can be supplied to one or more of PTP core 802, LED output control 804, and LED generator 806. For example, the value of N can be supplied, or otherwise provided, to counter 500 in PTP core 802 via the LED configuration options. There can also be separate counters 500 for each of the transmit and receive paths. Also, selection of a full or partial restriction mode can be supplied, or otherwise provided, via LED configuration options to timing protocol detector 302 in PTP core 802. Such configuration options can otherwise locally be supplied within PTP core 802, such as by a local register. Also, any configuration options or registers as discussed herein can be user-programmable or user- or manufacturer-optionable in any suitable way (e.g., fuse programming, non-volatile memory [NVM], metal-layer optioning, random-access memory [RAM], etc.).

The PTP core block 802 can receive a register value, such as via the LED configuration options, for user programming to select or identify N for the receive and/or transmit paths as described herein. For example, 8 bits can be allocated in the configuration register for the transmit path, and 8 bits can be allocated for the receive path. Default or reset values can be 0x00 to effectively disable timing protocol detection on the receive path, and 0x80 (N=128) for the transmit path (to enable a partial restriction mode and set the value of N). Any other default value or a default control signal (e.g., reset signal in FIG. 5) can also be used in particular embodiments. One example of the user-programmable configuration register values is as shown below in Table 3.

TABLE 3

| Register Value: | Function: |
| --- | --- |
| 0 | Filter all timing protocol frames from the LEDs |
| 1 | Do not filter any timing protocol frames from the LEDs |
| N (where N is > 1) | Filter all timing protocol frames with the exception of allowing through 1/N of the timing protocol frames for LED control purposes |

PTP core 802 can include time stamping logic 820, as well as detection logic (e.g., timing protocol detector 302) for determining frames that are timing protocol frames on either or both of the receive and transmit paths. Time stamping logic 820 can inspect payload or other data in a frame if a given field indicates that the frame is a timing protocol frame, in order to capture the time stamp for timing protocol purposes. If the frame is a timing protocol frame, the captured time stamp can be advanced to a register for further processing (e.g., for timing synchronization, etc.). The PTP_ACT_LED signal can account for either 0, 1, or N timing protocol (PTP) frames on the link (e.g., both receive and transmit), and can be coupled to the LED expansion wires 812 output from LED output control 804. Although six wires 812 are shown, the number of wires or control signals can be any number to support a given LED activation application. For example, expansion wires 812 can be used to provide control signals that convey to LED generator 606 when to activate an LED on a given port, whether the activation is for a solid "on" signal, a blinking signal, etc., where the activation control involves binary signaling (e.g., 6 bits for a single LED activation control). Other types of signaling, control, numbers of signals, etc., can be used in particular embodiments.

The receive (PTP_Rx_LED) and transmit (PTP_Tx_LED) signals can account for all activity on the link, except for the 0, 1, or N PTP frames (transmitted and/or received). Thus, the PTP_Tx_LED signal can convey an indication of each non-timing protocol frame detected on the transmit path that is to result in an LED activity function (i.e., that is not masked). Similarly, the PTP_Rx_LED signal can convey an indication of each non-timing protocol frame detected on the receive path that is to result in an LED activity function (i.e., that is not masked). The PTP_ACT_LED signal can represent non-masked timing protocol frame activity detected on either or both of transmit and receive paths, and that results in a corresponding LED activity function.

The particular example of FIG. 8 shows a relationship between PTP core 802 and LED output control 804, in turn coupled to LED generator 806 for generation of LED control signals 814. Applications without timing protocol control would not include PTP core 802 or signals associated therewith. Signals 816 (transmission frames) and 818 (received frames) represent those frames detected as timing protocol frames, such as those shown in FIGS. 6 and 7. Signals 816 and 818 can thus be control signals that indicate detection of timing protocol frames. Signals 816 and 818 can then be fully or partially masked out at LED generator 806 based on the configuration options, such as when a full restriction mode is enabled, or when the receive path is disabled for LED generation, or the like. In some embodiments, PTP_ACT_LED can represent a combination of signals 816 and 818, where signals 816/818 allow an associated LED to blink only for timing protocol frame activity.

An Exemplary Method of Controlling an LED

Figure 9:
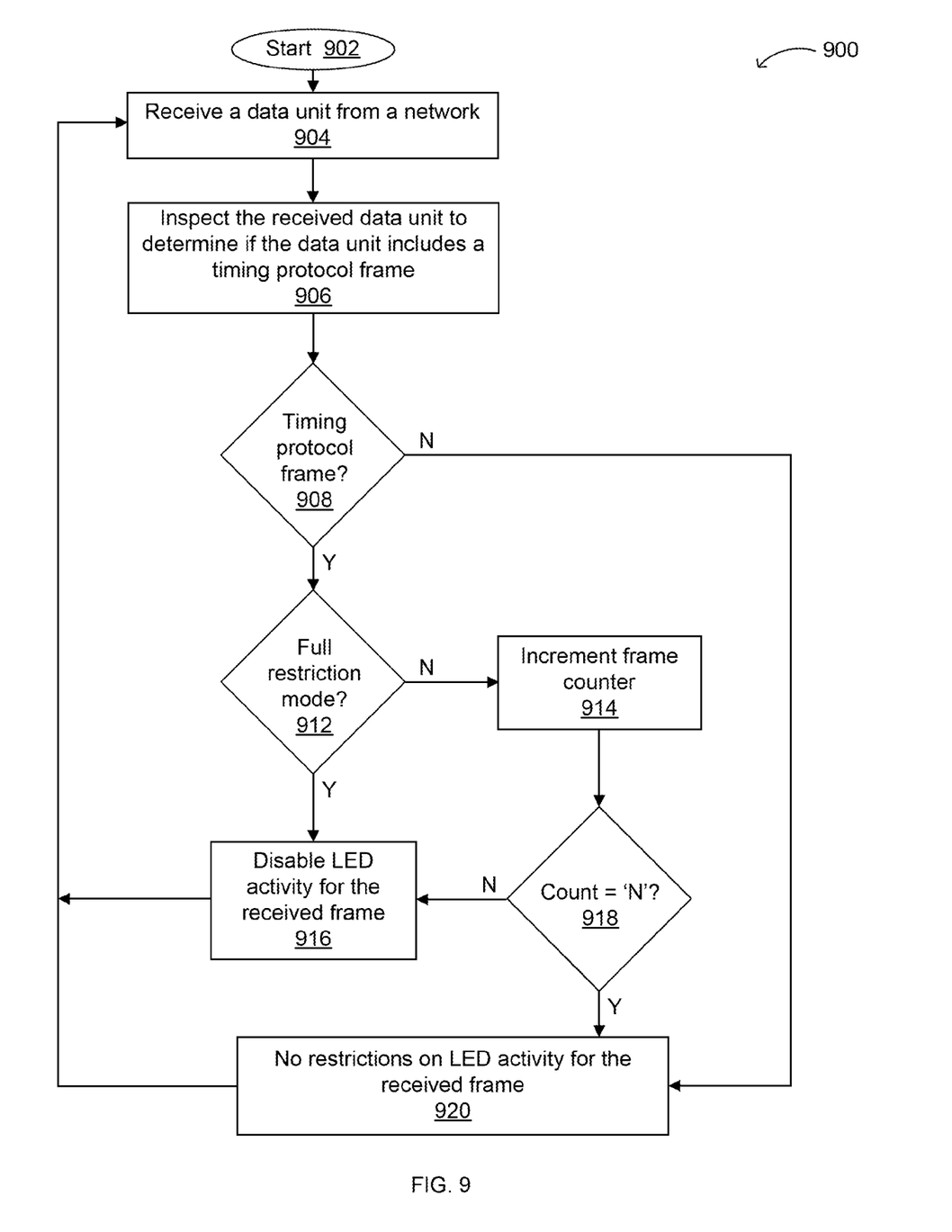
FIG. 9 is a flow diagram showing an exemplary method of controlling an LED.

FIG. 9 shows a flow diagram 900 of an exemplary method of controlling an LED. At 902, the flow begins, and at 904, a frame can be received from a network. The frame can be replaced by a packet or other data unit of fixed or predetermined length. At 906, the frame can be inspected to determine if it is a timing protocol frame. For example, one or more fields of the frame can be checked against predetermined values to detect whether that frame is a timing protocol frame, such as those fields/frames shown above in the examples of FIGS. 6 and 7. Other forms of frame or packet inspection, such as by using a designated bit or other flag, can also be accommodated in particular embodiments.

At 908, if the frame is not a timing protocol frame, the frame is treated as a data frame, and at 920, there are no restrictions on LED generation for the received frame. For example, if an LED is to blink based on receipt of data or control frames other than timing protocol frames (e.g., at a rate of X as shown above in Tables 1 and 2), this can be allowed to occur for such data traffic. However, if at 908 the frame is a timing protocol frame, a determination is made as to which type of restriction mode (e.g., full or partial restriction) is enabled. As discussed above, full or partial restriction mode can be a user selectable option. If at 912 a full restriction mode is enabled, LED activity (e.g., blinking) can be disabled at 916 for the received frame. Essentially, the full restriction mode fully masks out LED activity corresponding to timing protocol frames. This option leaves data or other control frames, as well as link establishment, to determine and/or cause LED activity.

At 912, if the partial restriction mode is enabled to allow some indication of timing protocol operation, at 914, a frame counter can be incremented. Alternatively, the frame counter can first be initialized to a predetermined value, and subsequently decremented instead of incremented. At 918, proceeding with the counter incrementing example, if the count is equal to the programmed or predetermined count value of N, at 920, no restrictions are placed on LED activity for the received frame. However, at 918, if the count is not equal to the program count value of N, at 916, LED activity can be disabled for the received frame. Thus, only 1 out of every N timing protocol frames detected results in corresponding LED activity. This effectively slows down the LED blinking rate (see, e.g., blinking rate Y in Table 2) to provide a heart beat type indication of timing protocol activity.

Exemplary Computer Program(s) and Software

The present disclosure also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the disclosure relates to algorithms and/or software that implement the above method(s). For example, the disclosure can further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program can be on any kind of readable medium, and the computer-readable medium can comprise any medium that can be read by a processing device configured to read the medium and execute code stored thereon or therein, such as a floppy disk, CD-ROM, magnetic tape or hard disk drive. Such code can comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

CONCLUSIONS

Thus, embodiments of the present disclosure provide a circuit, architecture, system and method for controlling an indicator of the status of a link or connection in a network (e.g., an LED) for frames or other data units involving timing protocols. The present approach can partially or fully mask LED blinking or other indicator activity for timing protocol frames, while allowing LED blinking/activity for data frames, thereby increasing a communications capability of a status indicator on a network port.

The foregoing descriptions of specific embodiments of the present invention have been presented for purposes of illustration and description. The embodiments are not intended to be exhaustive or to limit the invention to the precise forms disclosed, and obviously many modifications and variations are possible in light of the above teaching For example, one or more steps of the method described above may be performed in a different order (or concurrently) and achieve desirable results. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A controller comprising:
    a receiver configured to receive a data unit from a network;
    logic configured to detect whether the received data unit is a protocol control unit;
    logic configured to restrict activity of a status indicator in response to the received data unit being detected as the protocol control unit, wherein the logic configured to restrict activity of the status indicator includes:
        a counter configured to change a count value in response to the received data unit being detected as the protocol control unit;
        logic configured to disable the status indicator when the count value is not equal to a predetermined value; and
        logic configured to allow the activity of the status indicator when the count value is equal to the predetermined value; and
    logic configured to allow the activity of the status indicator in response to the received data unit being detected as a unit type other than the protocol control unit.

2. The controller of claim 1, wherein the status indicator comprises a light-emitting diode (LED).

3. The controller of claim 2, wherein the activity of the LED comprises turning on the LED or blinking the LED.

4. The controller of claim 1, wherein the logic configured to allow the activity of the status indicator in response to the received data unit being detected as a unit type other than the protocol control unit further comprises logic to direct the activity of the status indicator at a first rate.

5. The controller of claim 4, wherein the logic configured to allow the activity of the status indicator when the count value is equal to the predetermined value comprises logic configured to direct the activity of the status indicator at a second rate, the second rate being different from the first rate.

6. The controller of claim 1, wherein the logic configured to detect whether the received data unit is the protocol control unit comprises logic configured to access a field in a predetermined position of the received data unit.

7. The controller of claim 1, wherein the protocol control unit comprises a timing protocol unit.

8. The controller of claim 7, wherein the timing protocol unit comprises a precise timing protocol (PTP) frame.

9. A method comprising:
    receiving a data unit in a device coupled to a network;
    detecting whether the received data unit is a protocol control unit;
    restricting activity of a status indicator in response to the received data unit being detected as the protocol control unit by:
        changing a count value in response to the received data unit being detected as the protocol control unit;
        disabling the status indicator when the count value is not equal to a predetermined value; and
        allowing the activity of the status indicator when the count value is equal to the predetermined value; and
    allowing the activity of the status indicator in response to the received data unit being detected as a unit type other than the protocol control unit.

10. The method of claim 9, wherein the status indicator comprises a light-emitting diode (LED).

11. The method of claim 10, wherein the activity of the LED comprises turning on the LED or blinking the LED.

12. The method of claim 9, wherein allowing the activity in response to the received data unit being detected as a unit type other than the protocol control unit further comprises directing the activity of the status indicator at a first rate.

13. The method of claim 12, wherein allowing activity of the status indicator when the count value is equal to the predetermined value comprises directing the activity of the status indicator at a second rate, the second rate being different from the first rate.

14. The method of claim 9, wherein the detecting whether the received data unit is the protocol control unit comprises accessing a field in a predetermined position of the received data unit.

15. The method of claim 9, wherein the protocol control unit comprises a timing protocol unit.

16. The method of claim 15, wherein the timing protocol unit comprises a precise timing protocol (PTP) frame.

* * * * *